(12) United States Patent
Bodewes et al.

(10) Patent No.: US 6,540,064 B1
(45) Date of Patent: Apr. 1, 2003

(54) METHOD AND INSTALLATION FOR TRANSPORTING GOODS, AS WELL AS A COMBINATION OF A CONTAINER AND A WHEEL-SUPPORTED FRAME FOR TRANSPORTING GOODS

(75) Inventors: Harmannus Josephus Arnoldus Bodewes, Uden (NL); Petrus Theodorus Cornelus Vervoort, Sint-Oedenrode (NL); Jakobus Marie van den Goor, Nuenen (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 09/700,759

(22) PCT Filed: May 18, 1999

(86) PCT No.: PCT/NL99/00304

§ 371 (c)(1),
(2), (4) Date: Mar. 19, 2001

(87) PCT Pub. No.: WO99/59901

PCT Pub. Date: Nov. 25, 1999

(30) Foreign Application Priority Data

May 20, 1998 (NL) .......................................... 1009222

(51) Int. Cl.[7] .......................... B65G 17/00; B61B 13/00
(52) U.S. Cl. ............................. 198/465.1; 198/346.1
(58) Field of Search ........................ 198/465.1, 346.1

(56) References Cited

U.S. PATENT DOCUMENTS

| | | | | |
|---|---|---|---|---|
| 3,642,158 A | * | 2/1972 | Koennecke et al. .......... 198/21 |
| 3,648,819 A | * | 3/1972 | Converse, III et al. ....... 198/19 |
| 4,088,220 A | * | 5/1978 | Jacksch et al. ............. 198/472 |
| 4,722,653 A | * | 2/1988 | Williams et al. ............ 414/222 |
| 4,724,948 A | * | 2/1988 | Adams et al. ............ 198/474.1 |
| 4,863,179 A | * | 9/1989 | Isaacs ..................... 280/79.11 |
| 5,301,790 A | * | 4/1994 | Prydtz et al. ............... 198/349 |
| 5,412,863 A | * | 5/1995 | Prodel ......................... 29/799 |
| 5,472,220 A | * | 12/1995 | Stephan .................... 280/79.5 |
| 5,474,415 A | * | 12/1995 | Becker et al. .............. 414/421 |
| 5,537,937 A | * | 7/1996 | Juvik-Woods ............. 108/51.3 |
| 5,538,127 A | * | 7/1996 | Becker et al. ........... 198/465.1 |
| 5,582,114 A | * | 12/1996 | Feiner ....................... 108/51.1 |
| 5,823,549 A | * | 10/1998 | Morgan, Jr. ........... 280/33.998 |
| 5,882,172 A | * | 3/1999 | Kawai et al. ............... 414/749 |
| 5,947,259 A | * | 9/1999 | Leisner et al. ........... 198/465.3 |
| 6,257,152 B1 | * | 7/2001 | Liu ............................ 108/53.3 |
| 6,279,721 B1 | * | 8/2001 | Lyngso et al. ........... 198/369.2 |

* cited by examiner

*Primary Examiner*—Douglas Hess
(74) *Attorney, Agent, or Firm*—Oblon, Spivak, McClelland, Maier & Neustadt, P.C.

(57) ABSTRACT

The invention includes a method and apparatus for transporting goods, such as luggage at airports, wherein the goods are placed into containers which are moved along conveyor tracks by a driving device. The containers are either moved together with the frames over a conveyor track or without the frames over a conveyor track, whereby the conveyor track driving device can directly engage and drive the container when the frame is not present.

13 Claims, 5 Drawing Sheets

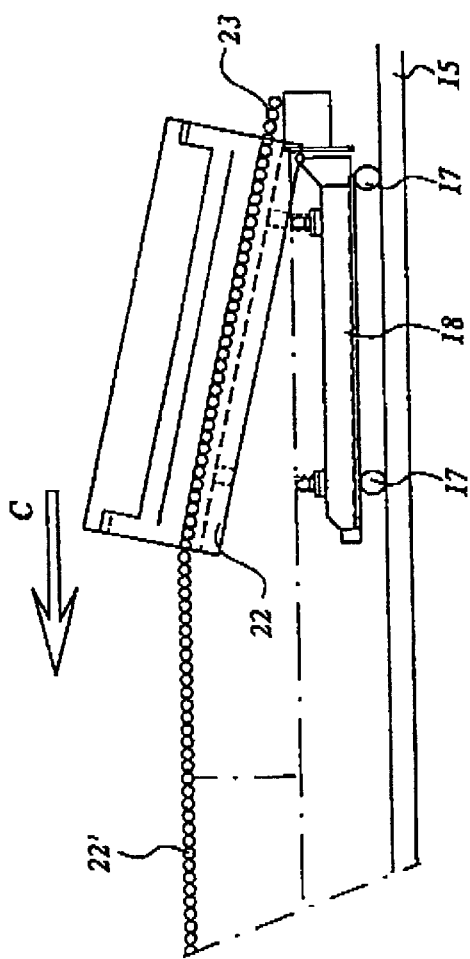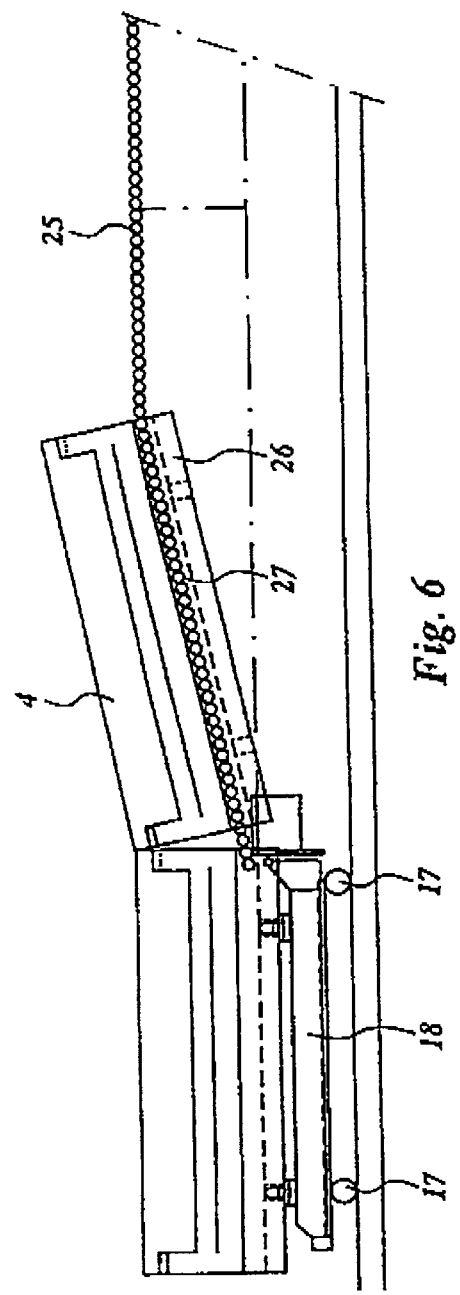

METHOD AND INSTALLATION FOR TRANSPORTING GOODS, AS WELL AS A COMBINATION OF A CONTAINER AND A WHEEL-SUPPORTED FRAME FOR TRANSPORTING GOODS

TITLE OF THE INVENTION

Method and installation for transporting goods, as well as a combination of a container and a wheel-supported frame for transporting goods.

BACKGROUND OF THE INVENTION

1. Field of the Invention

The invention relates to a method for transporting goods, such as luggage at airports, wherein the goods are placed into containers, which are moved along conveyor tracks by driving means which directly engage the containers so as to move them.

The present invention will be explained in particular on the basis of the transport of passenger luggage at airports, but it will be understood that it can for example also be used for internal transport of goods, to and from shopping centres, for example via underground conveyor tracks and the.

2. Discussion of the Background

The transport of luggage at airports increasingly involves the use of containers, in each of which a suitcase or the like is placed. From EP-A-0802129 conveyor tracks are known, whereby driving means, consisting of endless belts, directly engage the undersides of the containers, so as to carry said containers along. From European patent application no. 0456297 it is for example known to place the separate containers on a conveyor belt so as to transport them. In such cases, only comparatively low carrying velocities of the containers can be realised.

Furthermore it is known to use containers which are fitted with wheels, as for example disclosed in European patent application no. 0659624. When such containers provided with running wheels are used, it is possible to realise considerably higher velocities for the containers than when devices are used in which the containers are moved by means of transport means or driving means which directly engage the containers.

Depending on the intended handling and on the routes along which luggage must be transported at airports, which routes are quite long in some cases, there is a need for conveyor tracks over which the luggage can be moved at a comparatively low velocity as well as for conveyor tracks over which the luggage is to be moved at the highest possible velocity. In addition, in many cases the luggage must be stored for a prolonged period of time at a predetermined station before it can be transported further, either in order to be delivered to the passenger or to be loaded into an aeroplane or the like. It is undesirable thereby to store expensive equipment together with the luggage, since it is not possible in that case to make an efficient use of said equipment.

SUMMARY OF THE INVENTION

The object of the invention is to realise a method of the above kind in the most economic possible manner.

According to the invention, this objective can be accomplished in that use is made of containers which can be removably placed on wheel-supported frames, and that the containers are either moved together with the frames over a conveyor track provided with driving means for driving the wheel-supported frames, or without said frames over a conveyor track provided with driving means which directly engage the containers so as to move them.

By using the method according to the invention it becomes possible to use only one type of container, which may or may not be connected to a wheel-supported frame, as desired, so as to move the containers and the goods that may be present therein quickly or slowly, as desired. When the luggage is to be stored for some time, the luggage-containing containers can be placed in a designated storage station without the wheel-supported frames, so that an optimum use of the wheel-supported frames can be realised. Also empty containers can be stored without the frames.

According to the invention, a suitable installation comprising at least one conveyor track provided with driving means for moving containers which are directly engaged by said driving means and destined for realising the above method is characterized in that guide installation comprises at least one conveyor track provided with guide rails and with driving means for moving wheel-supported frames along said guide rails.

An efficient combination of a container and a wheel-supported frame to be used thereby is characterized in that said frame and said container are provided with parts engaging each other, which are so arranged that a container supported on said frame can be pushed off the frame in upward direction and/or that a container can be placed onto said frame in downward direction.

BRIEF DESCRIPTION OF THE DRAWINGS

The invention will be explained in more detail hereafter with reference to the accompanying figures.

FIG. 5 schematically shows a station in which a container is separated from a wheel-supported frame.

FIG. 6 schematically shows a station in which a container is placed on a wheel-supported frame.

DETAILED DESCRIPTION OF THE DRAWINGS

Figure 1:
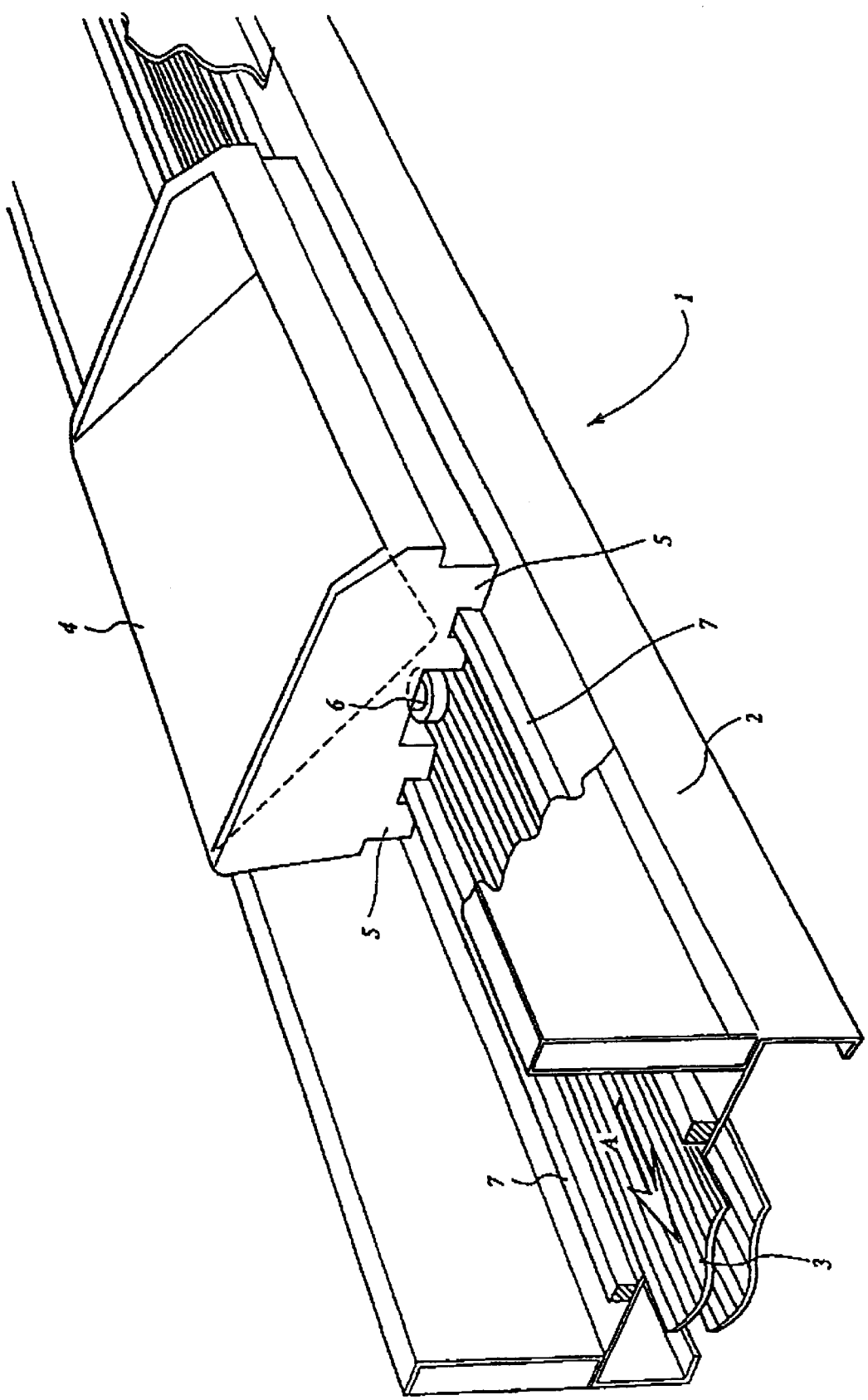
FIG. 1 schematically show a portion of an embodiment of a conveyor track provided with a driving element, which directly engages a container to be moved.

FIG. 1 shows a portion of a conveyor track 1 comprising a frame 2, in which an endless conveyor belt 3 is accommodated. Conveyor belt is 3 guided in a manner which is known per se, and it can be driven (by means not shown) in such a manner that the upper part of the conveyor belt will move in the direction indicated by arrow A during operation.

Conveyor belt 3 is intended for moving containers 4 suitable for receiving goods, in particular luggage, in the longitudinal direction of conveyor track 1. Said containers are provided on their underside with four spaced-apart ribs 5 extending in the longitudinal direction or in the intended direction of movement indicated by arrow A. A guide roller 6, which is rotatable about a vertical axis of rotation, is furthermore provided between the two inner ribs.

Frame 2 is further provided with guide rails 7 extending in the longitudinal direction of conveyor track 1, the arrangement being such that two ribs 5 of a container to be moved are disposed on either side of each guide rail 7, as will be apparent from FIG. 1.

The undersides of the two central ribs 5 are supported on the upper part of conveyor belt 3, so that container 4 will be carried along by conveyor belt 3 during operation.

When using an embodiment as shown in FIG. 1, the containers are usually moved at a velocity of up to ±2 m/sec.

Figure 2:
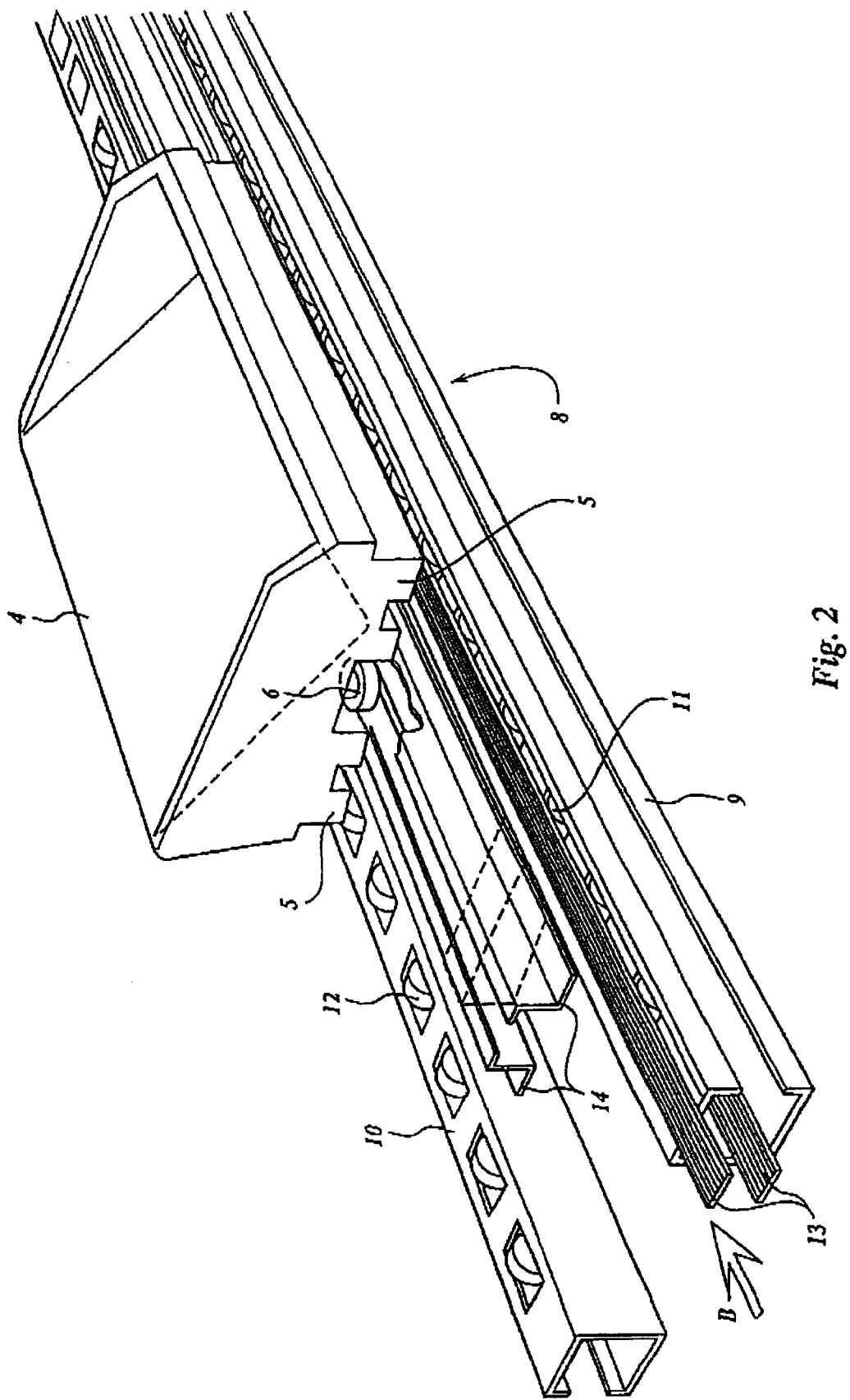
FIG. 2 is a schematic, perspective view of a portion of a second embodiment of a conveyor track provided with a driving element, which directly engages a container to be moved.

It is also possible, for example, to move the same containers 4 along a conveyor track 8 as shown in FIG. 2.

Said conveyor track is provided with two tubular beams 9 and 10 extending parallel to each other, in which rollers 11 and 12, respectively, which are rotatable about axes extending perpendicularly to the longitudinal direction of said beams, are disposed in such a manner that said rollers 11 and 12 project from the upper surfaces of beams 9 and 10, respectively.

Supported on the parts of rollers 12 that project above beam 10 is the upper part of an endless belt 13, which can be driven by means not shown, in such a manner that the upper part will for example move in the direction indicated by arrow B. The container 4 to be moved is supported on the upper part of conveyor belt 13 with an outer rib 5, whilst another outer rib 5 is supported on the parts of rollers 11 that project above beam 9.

Guide wheel 6 moves between guide rails 14 extending parallel to beams 9 and 10.

With an embodiment as shown in FIG. 2, carrying velocities of container 4 of up to ±6 m/sec can be realised.

Figure 3:
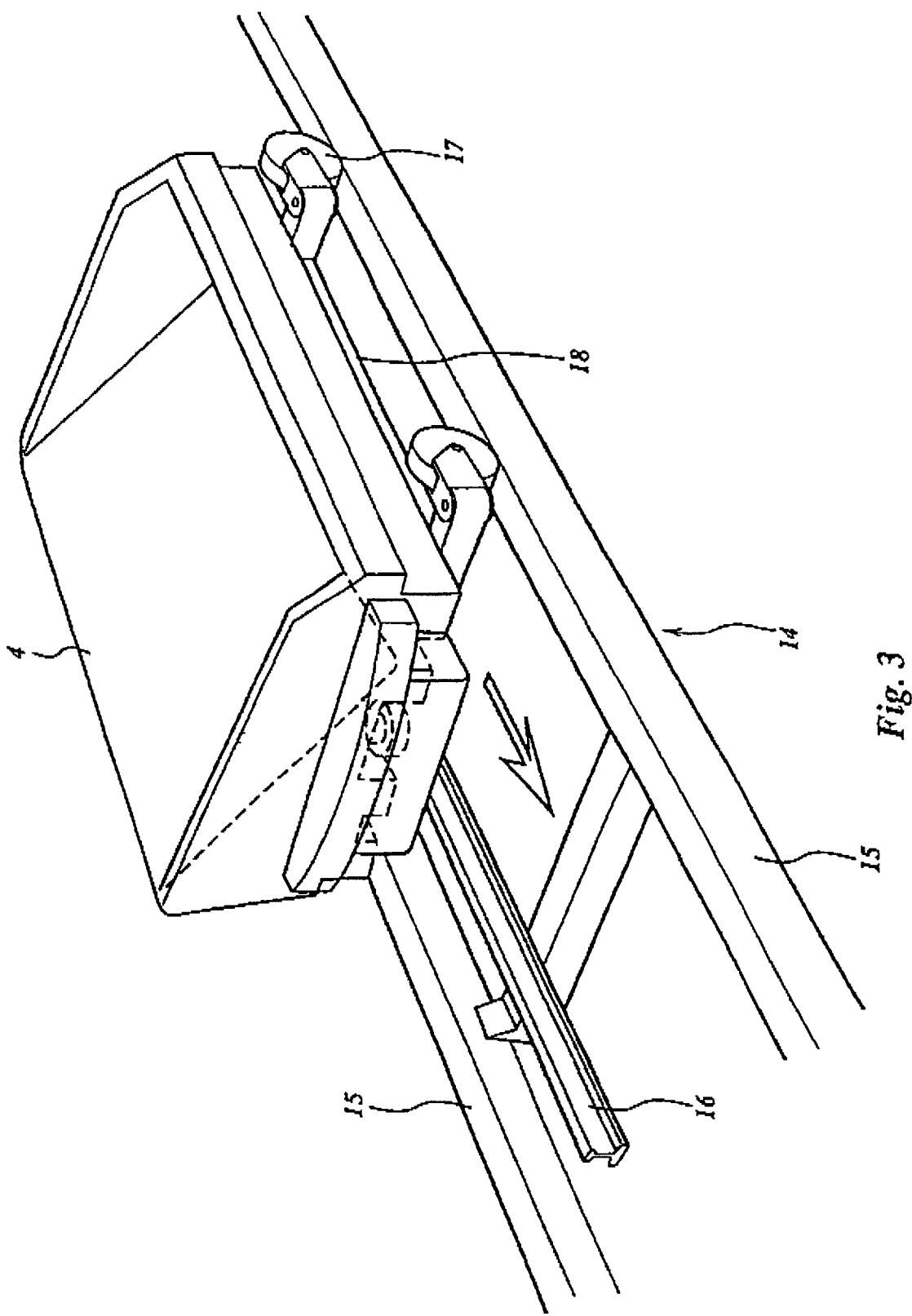
FIG. 3 is a schematic, perspective view of a portion of a conveyor track for moving a combination of a container and a wheel-supported frame.
Figure 4:
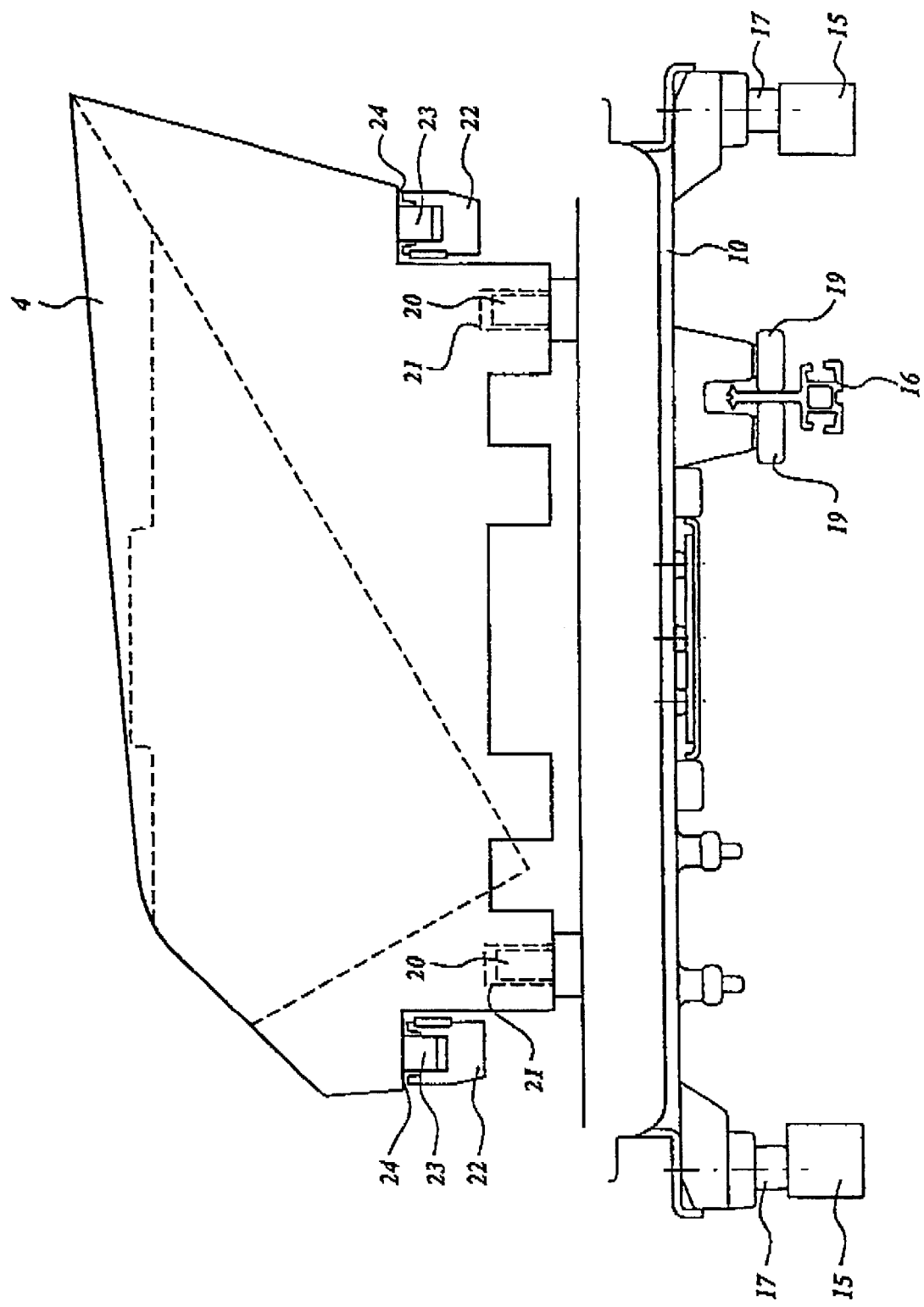
FIG. 4 schematically shows a wheel-supported frame and a container present thereon.

FIG. 3 schematically shows a portion of a conveyor track 14 which is provided with two supporting rails 15 extending in the longitudinal direction of the conveyor track, and one guide rail 16 extending between and parallel to supporting rails 15. Supported on supporting rails 16 are self-adjusting wheels 17 of a frame 18 supported by said wheels. As is shown in more detail in FIG. 4, said frame is further provided with two guide rollers 19 mounted on the underside of the frame, which are rotatable about vertical axes of rotation, which guide rollers cooperate with guide rail 16 in the manner shown in FIG. 4 so as to guide frame 18 during its movement over supporting rails 15. The construction and operation of such a conveyor track are described in more detail in the aforesaid European patent application No. 0 659 624.

A container 4 is detachably placed on said frame 18 provided with running wheels 17. In order to effect a proper connection of container 4 to frame 18, said frame 18 is provided with a few vertically upwardly extending pins 20, which fit corresponding open recesses 21 provided in the underside of container 4. The combination of a frame 18 and a container 4, which can be driven conventionally by driving means in the form of linear electric motors, can be moved along the guide rails at velocities of ±10 m/sec or more.

FIG. 5 schematically show a station in which a container 4 can be removed from a frame supported by running wheels. As is shown in FIG. 5, two parallel beams 22 of U-shaped section are disposed in such a station, which beams slope upwards from one end. A large number of rollers 23 rotatable about horizontal axes are supported in said beams. Also embodiments comprising belts or chains are conceivable, however. When a combination of a frame 18 supported by wheels 17 and a container 4 present thereon is moved over supporting rails 15 in the direction indicated by arrow C, the rollers which are present near the lower ends of beams 22 will engage under collar portions 24 of container 4 at some point. Upon further movement of the combination of frame 18 and container 4, the container will be moved along the upwardly sloping beams 21, whilst frame 18 will move further on the horizontally extending supporting rail 15. It will be apparent that container 4 will be gradually pushed off frame 18 in upward direction thereby.

The frame 18, from which the container has been removed, can then be guided to a further station over the rails so as to be combined with another container at that location, as will be described in more detail below.

A further conveyor track 22' (schematically indicated) joins the upwardly extending beams 22, which conveyor track may be arranged as described above with reference to FIGS. 1 and 2, and by means of which the container can be transported to a desired station, for example a storage station.

As is shown in FIG. 6, a container can be supplied to a station for placing a container 4 onto a frame 18 via a schematically indicated conveyor track 25, which may for example be arranged in the manner as described above with reference to FIGS. 1 and 2. Disposed in said station, in adjoining relationship to conveyor track 25, are two beams 26 provided with rollers 27, which slope downwards from conveyor track 25, whereby beams 26 and rollers 27 may be arranged similarly to beams 22 and rollers 23. Container 4 will roll downwards over said beams 26 provided with rollers 27 in the direction of a frame 18 disposed in said station so as to be placed onto said frame 18, whereby the pins 20 formed on frame 18 will be inserted into the recesses 21 present in the underside of the container again so as to effect a firm connection between the container and the fame in a movement which is essentially the reverse of the movement which is made to remove container 4 from frame 18. Also in this embodiment it is possible to use belts or chains rather than rollers 27.

It will be apparent that an installation for transporting luggage at an airport may comprise several conveyor tracks of the above kind which connect to each other, so that the luggage can be moved at predetermined velocities along predetermined routes. It is possible thereby to use the same containers 4 for moving the luggage along the various routes, which containers may or may not be combined, as desired, with a frame 18 supported by wheels 17. It is possible thereby to use an optimum number of containers and an optimum number of frames.

Thus it is for example possible to transport containers 4, which may or may not be filled with luggage, to a storage location at a high velocity, whereby the frames 18 provided with running wheels are separated from the containers 4 before said containers are stored, so that said frames 18 can be used again for transporting further containers. When the containers 4 being stored at said storage location are needed again, they may or may not be connected to a wheel-supported frame 18, depending on the speed at which they are to be moved to a next station, and be taken to a desired next station.

Furthermore it is possible, for example at a counter where the passengers hand in their luggage, to place the luggage in containers 4, which are not combined with frames 18 and which are moved slowly ahead, possibly intermittently, whilst in a further station said containers 4 are combined with the frames 18 provided with wheels 17 for quick further transport.

Thus, a great many uses are conceivable.

What is claimed is:

1. A method for transporting goods, wherein the goods are placed into containers, which can be moved along conveyor tracks by a driving mechanism, which directly engages the containers so as to move them, wherein use is made of containers which can be removably placed on wheel-supported frames, and wherein the containers are either moved together with the frames over a conveyor track provided with the driving mechanism for driving the wheel-supported frames, or without said frames over said conveyor track provided with the driving mechanism which directly engages the containers so as to move them.

2. A method according to claim 1, wherein the containers not supported by frames are moved by a conveyor belt engaging the underside of said containers.

3. A method according to claim 1, wherein said wheel-supported frames are moved along a respective conveyor track by linear electric motors.

4. An installation for transporting goods between several stations comprising at least one conveyor track provided with a driving mechanism configured to move containers which are directly engaged by said driving mechanism for using the method according to claim 1, wherein said installation further comprises at least one conveyor track provided with guide rails and with a further driving mechanism configured to move wheel-supported frames along said guide rails.

5. An installation according to claim 4, wherein at least one conveyor track is provided with linear motors for moving wheel-supported frames.

6. An installation according to claim 4, wherein a conveyor track is provided with a driving element in the form of an endless belt.

7. An installation according to claim 1, wherein said installation is provided with a guide configured to slope upwards with respect to guide rails supporting the wheels of a frame, which guide is adapted to engage a container.

8. An installation according to claim 1, wherein said installation is provided with a guide for the containers, configured to slope downwards from a supply track for containers in the direction of guide rails supporting the wheels of a frame.

9. A combination of a container and a wheel-supported frame for use in an installation for transporting goods between plural stations comprising:

at least one conveyor track provided with a guide rail and provided with supporting rails supporting wheels of the wheel-supported frame along said supporting rails, wherein said frame and said container of the combination are provided with parts engaging each other, said parts being arranged so that a container supported on said frame can be pushed off the frame in an upward direction and/or that a container can be placed onto said frame in a downward direction.

10. A combination according to claim 9, wherein said frame is provided with upwardly extending pins and said container is provided with corresponding holes arranged near sides of the container.

11. A combination according to claim 9, wherein said container is provided on its underside with parallel ribs, whose undersides lies in one plane.

12. A combination according to claim 9, wherein said container is provided near a center of its underside with a guide wheel that is rotatable about a vertical axis for cooperating with said guide rail of said installation.

13. A combination according to claim 9, wherein said container is provided with two projecting collars at two opposite sides of the container, said collars extending in an intended direction of movement during operation.

* * * * *